M. L. SENDERLING.
Sugar-Molds.

No. 166,150. Patented July 27, 1875.

Witnesses
John Becker
Fred Haynes

M. L. Senderling
by his Attorneys
Brown & Allen

UNITED STATES PATENT OFFICE.

MARTIN L. SENDERLING, OF JERSEY CITY, NEW JERSEY.

IMPROVEMENT IN SUGAR-MOLDS.

Specification forming part of Letters Patent No. 166,150, dated July 27, 1875; application filed December 10, 1874.

*To all whom it may concern:*

Be it known that I, MARTIN L. SENDERLING, of Jersey City, in the county of Hudson and State of New Jersey, have invented certain new and useful Improvements in Sugar-Molds, also applicable to molds for molding other substances; and I do hereby declare that the following is a full, clear, and exact description of the same, reference being had to the accompanying drawing forming part of this specification:

This invention more particularly relates to the production of sugar in sticks, which may afterward be divided into cubes or blocks. The invention consists in a mold divided throughout its depth by zigzag or serpentine partitions, when constructed in sections mounted one upon the other, with a close joint at the meeting edges of the sections, whereby a series of sections, each virtually forming a separate mold, may be filled simultaneously, thereby producing important results as hereinafter described. The whole series of mold-sections may either be filled from above or below, the lower mold-section being provided with a lower tube or opening, which may either be used as a filling-aperture or as an air-vent, accordingly as the mold is filled from above or below.

Figure 1:
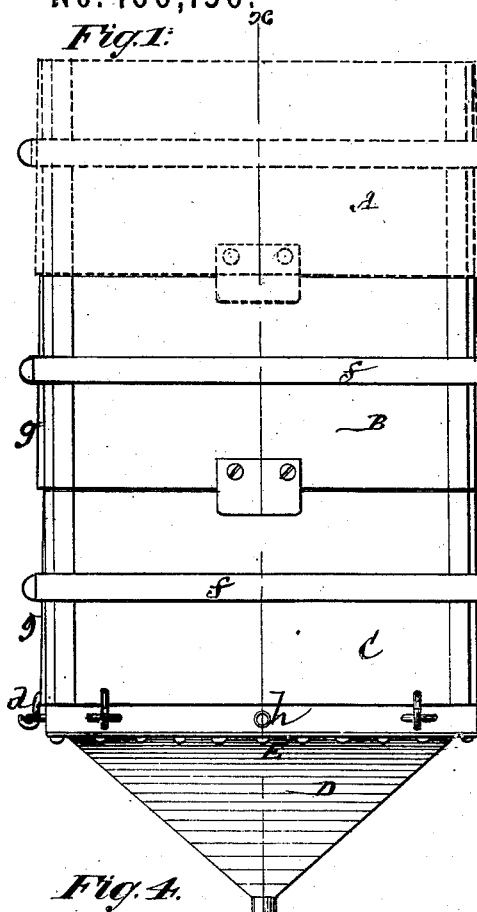
Figure 2:
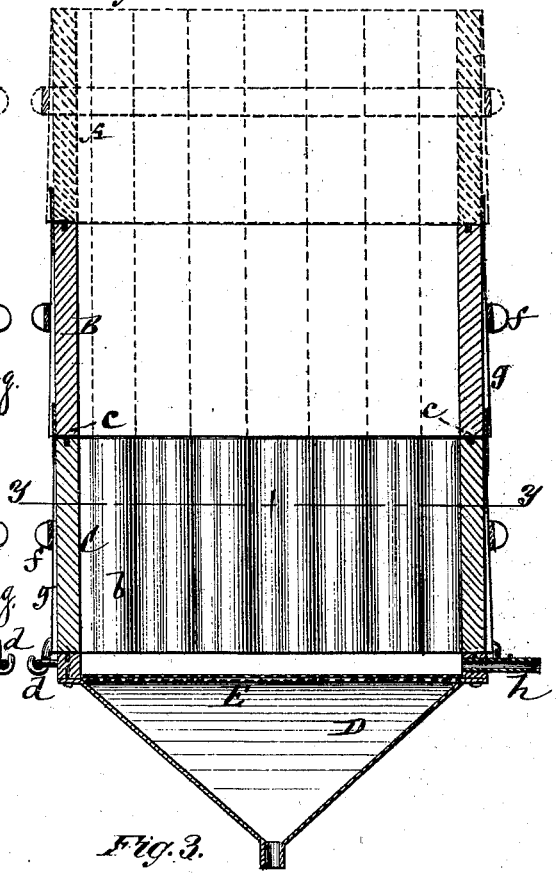
Figure 3:
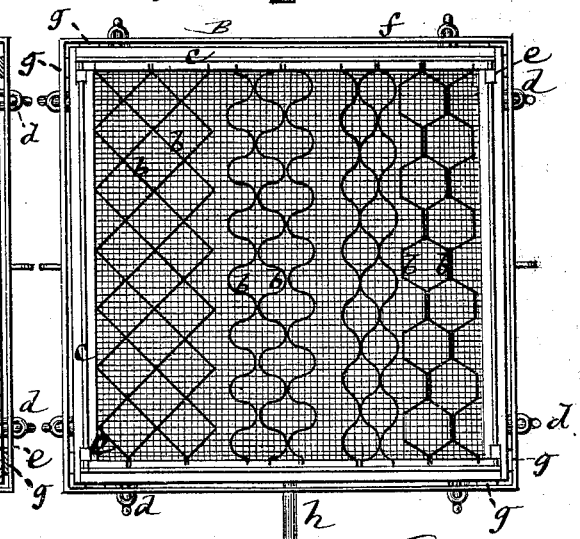

In the accompanying drawing, Figure 1 represents an outside elevation of a sectionally-constructed mold, in accordance with my invention; Fig. 2, a vertical section on the line $x\ x$ of the same, with the serpentine partitions, shown by full lines only, in the lower division of the mold. Fig. 3 is a plan of the entire mold, and Fig. 4 a horizontal section on the line $y\ y$ of Fig. 2.

Figure 4:
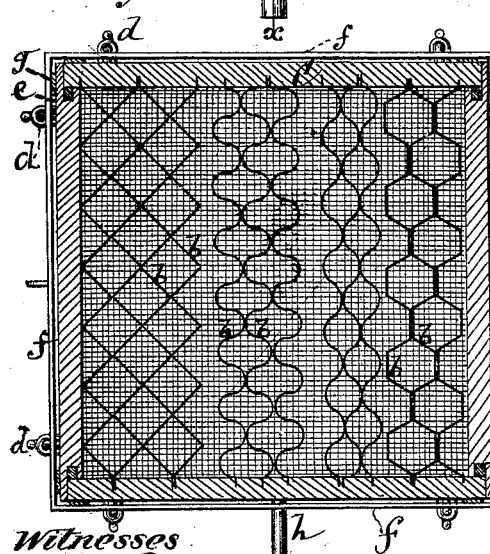

A, B, and C are three mold-sections, mounted one upon the other, to form a continuous mold, and of which there may be any number—that is, two or more—of such sections. Each of these mold-sections virtually forms a mold, and may be of similar general construction. Thus, taking the lower mold-section C, for instance, the same is fitted with any desired number of zigzag or serpentine partitions, $b$ $b$, made separate the one from the other, and removable, but so that when in place—that is, arranged in pairs in reverse relation with each other—they will form molding-cavities of any desired shape in their transverse section, as, for instance, quadrangular, oval, or polygonal, as shown in Figs. 4 and 5, for molding sticks of corresponding form. The mold-sections may either be square or of any other suitable shape, but are here shown and will be described as of rectangular form. Said mold-sections, where they rest one upon the other, have their joints made tight, by means of elastic packings $c$, inserted in the one edge of the meeting sections, or a ground-joint may be substituted therefor, or an external and internal and internal flange may be cast or fastened to the meeting edges of the mold-sections. Furthermore, to adapt a particular form of mold to the filling of the same, an intermediate plate may be introduced between said sections, so that one portion of said plate may conform to one side or end of a mold-section, and the other portion of said plate to the other end of the mold-section. Each of the mold-sections A B C is supposed to be fitted with similarly shaped and arranged partitions $b$, so as to form a continuous series of stick-molding cavities.

One of the objects of such sectionally-constructed molds is that a number of molds or mold-sections may be filled at one and the same time, and another object is that by filling a number of mold-sections, one on top of the other, evaporation takes place only from the surface of the top mold-section, and so forming a single crust, thus saving time and labor to clear off crust, besides utilizing a larger proportion of the substance molded. Likewise, when an upper mold-section has been drained it may be removed and be put into a drying-house while a lower mold section or sections are draining. Either mold-section may be constructed in parts—that is, with removable or hinged sides, as by hooks and cleats $d$—to facilitate the removal of the partitions $b$, and of the sticks molded within them. To make a tight joint, the corners or meeting edges of the sides of the mold-sections should be provided with rubber or other elastic packings $e$, and such opening and closing mold-sides be tightened up and held in place by means of straps or bands $f$, fitting over inclined or wedge-shaped projections $g$, at the corners of the molds.

It is preferred to make the partitions b of thin tempered steel plates, so that when opening the molds and separating the partitions with the sugar or molded substance within them, a certain spring is secured which tends to separate the sticks from the partitions.

The lower mold-section C is fitted with a removable taper bottom, D, and strainer E, which latter may either be a perforated plate or wire-cloth. This construction is applicable to draining in a mold-house, and differs from an ordinary tapered mold which requires to be plugged when filling, inasmuch as plugging may here be dispensed with.

When it is required to drain the mold-sections in a centrifugal machine, then a close removable bottom may be substituted for the conical or taper one D, with its strainer E. The whole sectionally-constructed mold may be filled either from above or below. To this end, the lower mold-section is provided with a pipe or aperture, $h$, at or near its bottom, which opening may either serve as a filling-aperture, when, as the mold is filled, the air will escape from above; or, in case of filling the mold from its upper end, said aperture serves as a vent for the escape of air.

I claim—

A mold divided throughout its depth by zigzag or serpentine partitions, and constructed in sections, mounted the one upon the other with a close joint at the meeting edges of the sections, substantially as and for the purpose specified.

MARTIN L. SENDERLING.

Witnesses:
MICHAEL RYAN,
FRED. HAYNES.